Nov. 7, 1967

R. H. HOGSTROM 3,351,369

LATCHING STRUCTURE FOR CLOSURE OPERATOR

Filed Aug. 5, 1966

INVENTOR
RALPH H. HOGSTROM

BY Richard C. Lindberg

ATTORNEY 3,351,369
LATCHING STRUCTURE FOR CLOSURE OPERATOR

Ralph H. Hogstrom, Chicago, Ill., assignor to Henro Manufacturing Co., a corporation of Illinois
Filed Aug. 5, 1966, Ser. No. 570,668
2 Claims. (Cl. 292—263)

This invention relates generally to closure operators of the torsion spring hinged arm type, and has particular reference to a latch structure for maintaining the hinged arms in position when the torsion spring has its tension released in moving a closure panel to its open position.

The structure according to the present invention is particularly adapted for use with closure panels which are moved to closed position against the force of a torsion spring disposed at the hinge point of a panel operator of the torsion spring hinged arm type. When the panel is moved to the open position the spring tension is released.

Such closure panels have been used for vending products from the sides of a vehicle, and gusts of wind have sometimes caused unwanted swinging of the panels. The provision of a latching structure capable of taking such wind forces and restraining the panel against movement is a particular object of this invention.

Another object is the provision of a latching structure characterized by the absence of pin connections for rocking movement of a latch member to locking and release positions.

Still another object is to provide a latching structure comprised of a latch supporting member totally enclosing the spring biasing means and the latch member except for the protruding notched latch finger and actuator.

Other objects and important features of the invention will be apparent from a study of the specficiation following taken with the drawing which together describe and illustrate a preferred embodiment of the invention and what is now considered to be the best mode of practising the principles thereof. Other embodiments may be suggested to those having the benefit of the teachings herein, and such other embodiments are intended to be reserved especially as they fall within the scope of the subjoined claims.

Figure 1:
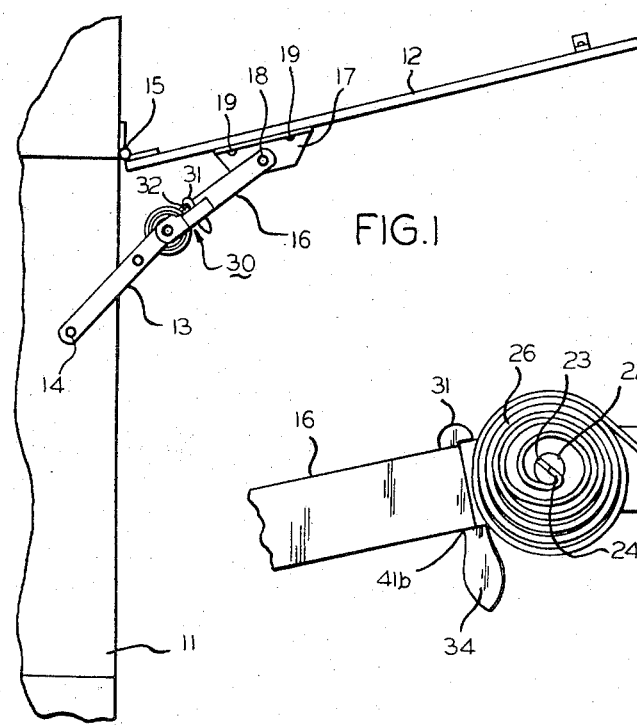
FIG. 1 is a side view showing a closure panel and operator, and having the improved latching structure according to the present invention incorporated therein.
Figure 3:
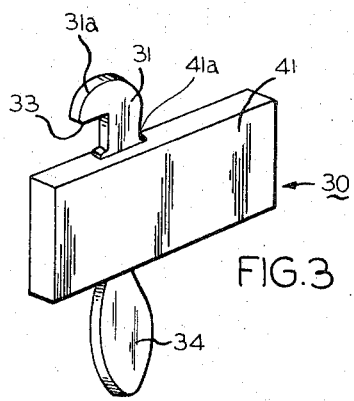
FIG. 3 is an isometric view of the latching structure.
Figure 2:
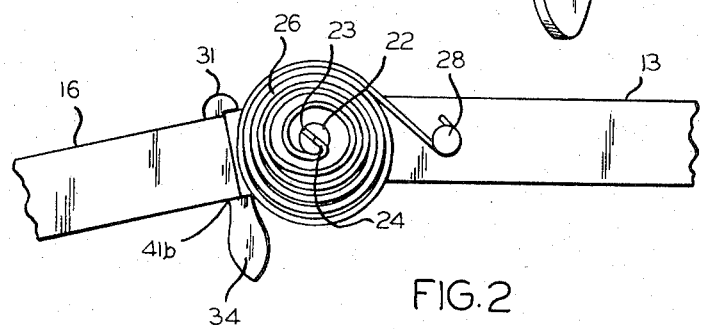
FIG. 2 is a side view of a closure panel operator having the latching structure incorporated therewith.

Referring now to FIG. 1, there is shown a portion of a vehicle body 11 having a side closure panel 12 hinged thereto at 15. Closure panel 12 moves to closed position on the body 11 against the force of a closure operator of the torsion spring hinged arm type including a first hinge arm 13 pivotally connected at 14 to the body 11, a second hinge arm 16 pivoted to first hinge arm 13 and to a mounting bracket 17. Second hinge arm 16 is pivoted at 18 in any convenient manner to mounting bracket 17 which is held by securing means 19 to the closure panel 12.

The two hinge arms 13 and 16 are held together for pivoting movement with respect to each other by a rivet 21 having a head 22 provided with a slot 23 to receive one end 24 of a spirally wound torsion spring 26 flanking the two hinge arms 13 and 16. Spring 26 has its other end hooked about a pin abutment 27 extending from hinge arm 13, said pin abutment 27 having a head 28 holding spring 26 in place.

When closure panel 12 is moved to the position seen in FIG. 1, the arms 13 and 16 are substantially in a straight-away position, and the tension in torsion spring 26 is at a minimum, and the panel 12 is easily subject to deflections by external forces such as wind. Structure is accordingly provided for releasably locking the hinge arms 13 and 16 in the position seen in FIG. 1, and to this end a latching structure, denoted generally by the reference numeral 30, as seen more particularly in FIGS. 3 and 5 to 7 is provided.

Broadly considered, latching structure 30 consists of a latching finger 31 adapted to engage with a strike 32 bent to one side of hinge arm 13 and extending over one edge of the other hinge arm 16. Latching finger 31 has a notch 33 engageable with strike 32, and is also coterminous with a latch actuator 34. Latching finger 31 has a smooth surface 31a adapted to slide readily over surfaces on the strike 32 in moving to the latched position seen in FIG. 1. Latching finger 31 and its actuator 34 extend from an integral hub 36 having an external cylindrical bearing surface 37 complementary to an internal cylindrical surface 38 of a recess 39 in a latch supporting body member 41. Body member 41 has slots 41a and 41b to permit the latch finger 31 and actuator 34 to rock freely with hub 36.

The latter has a cylindrical recess 39 milled therein with the cylindrical surface 38 to provide good bearing contact for the integral hub 36 and the latching finger 31 and actuator 34.

The rocking movement of the latch finger 31 is opposed by a coil spring 42 held in a drilled recess 43 in body member 41, and having one end bearing against a notch 44 in the hub 36, the other end of coil spring 42 bearing against the bottom of recess 43.

Figure 4:
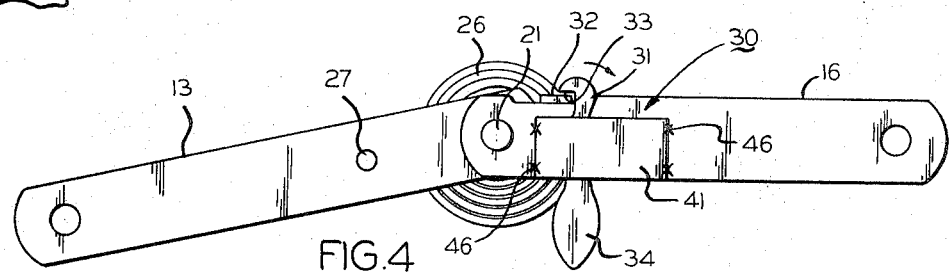
FIG. 4 is an opposite side view of the closure operator seen in FIG. 2.
Figure 5:
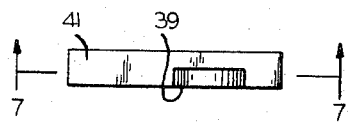
FIG. 5 is a top view of the latching structure.
Figure 6:
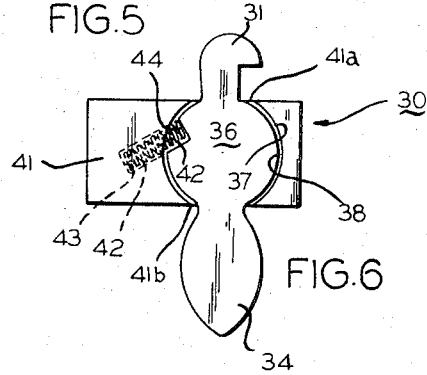
FIG. 6 is a side view thereof.
Figure 7:
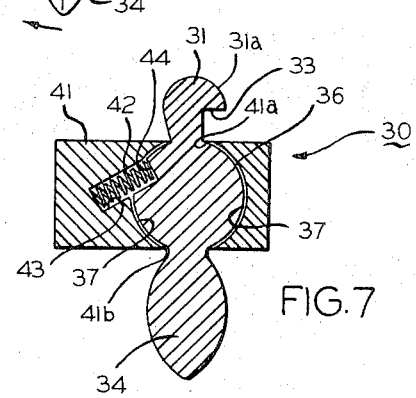
FIG. 7 is a section looking in the direction of the arrows 7—7 of FIG. 5.

One side of hub 36 lies in coplanar relationship with a side of the body member 41, and the hub 36 and its latching finger 31 and actuator are adapted to be held against a side of the hinge arm 16 with the latch finger 31 in a position of releasable engagement with the strike 32. Body member 41 and the latching means are held in proper position on the hinge arm 16 by simple tack weldments 46 as seen more clearly in FIG. 4. A side of body member 41 and the hub are in coplanar relationship so that arm 16 supports hub 36 for rocking movement.

By reason of the cylindrical surface 37 of hub 36 and the mating cylindrical surface 38 in body member 41 any loads against the latch finger 31 are easily accommodated. By reason of the large cooperating surfaces a minimum of wear occurs.

In moving to the latched position seen in FIG. 1, the smooth surface 31a on latch finger 31 moves past the strike 32, the latch finger 31 rocking against the bias of spring 42 during such movement as required, until strike 32 is engaged in notch 33. When it is desired to release the latch structure described the actuator 34 is rocked in an opposite direction to release strike 32 from notch 31, at which time the closure panel 12 can be rocked about hinge 15 to a closed position against the bias of spring 26.

Having thus described this invention in such full clear, concise and exact terms as to enable any person skilled in the art to which it pertains to make and use the same, and having set forth the best mode contemplated of carrying out this invention, the subject matter regarded as being patentable is particularly pointed out and distinctly claimed in what is claimed, it being understood that equivalents or modifications of, or substitutions for, parts of the above specifically described embodiment may be made without departing from the scope of the invention as set forth in what is claimed.

I claim:
1. A latching structure for a closure panel operator having a pair of arms hingedly connected and biased to a substantially straight-away position by a torsion spring supported at a hinge connection between said arms and constrained between said hinge connection and one of said arms, a strike extending from one of said arms, and a latching structure supported on the other of said arms adapted to be releasably engaged with said strike, said latching structure being supported on the other of said arms and comprising a body member having a cylindrical recess therein, a latching member supported in said cylindrical recess and having a hub complementary to said recess for free turning movement therein and adapted to transmit the loads on said latching member with good distribution of stress, a latch finger extending from said hub and having a notch therein adapted to engage with said strike, a latch actuator extending in the opposite direction from said hub for rocking said latch member to a position of release with said strike, a notch in said hub and a recess in said body member, and a spring supported in said recess and acting between said body member and said hub for biasing said latch finger to latching position.

2. The latching structure of claim 1 wherein one side of said hub is coplanar with a side of said body member, and a side of said arm provides a surface for support of said hub.

References Cited
UNITED STATES PATENTS

| | | | |
|---|---|---|---|
| 1,552,988 | 9/1925 | Hoberg | 292—263 |
| 2,038,143 | 4/1936 | Swanson | 287—99 |
| 3,093,258 | 6/1963 | Turner | 292—263 |
| 3,187,373 | 6/1965 | Fisher | 16—144 |

FOREIGN PATENTS

| | | |
|---|---|---|
| 501,459 | 2/1939 | Great Britain. |

MARVIN A. CHAMPION, *Primary Examiner.*

E. J. McCARTHY, *Assistant Examiner.*